United States Patent
Ranta-aho et al.

(10) Patent No.: US 7,848,279 B2
(45) Date of Patent: Dec. 7, 2010

(54) USER EQUIPMENT

(75) Inventors: Karri Ranta-aho, Espoo (FI); Harri Holma, Helsinki (FI); Juho Pirskanen, Tampere (FI)

(73) Assignee: Nokia Corporation, Espoo (FI)

( * ) Notice: Subject to any disclaimer, the term of this patent is extended or adjusted under 35 U.S.C. 154(b) by 828 days.

(21) Appl. No.: 11/673,074

(22) Filed: Feb. 9, 2007

(65) Prior Publication Data

US 2007/0189236 A1    Aug. 16, 2007

(30) Foreign Application Priority Data

Feb. 10, 2006  (GB) .................................. 0602762.7

(51) Int. Cl.
*H04W 4/00* (2009.01)
(52) U.S. Cl. ................. 370/328; 370/312; 370/335; 370/342; 455/426.2; 455/517; 455/522
(58) Field of Classification Search ............... 370/216, 370/262, 263, 328, 332, 320, 333, 334, 335, 370/342, 340, 350; 455/416, 434, 519, 520, 455/525, 550.1, 550.2, 561
See application file for complete search history.

(56) References Cited

U.S. PATENT DOCUMENTS

2002/0170013 A1* 11/2002 Bolourchi et al. ............ 714/758
2003/0157953 A1*  8/2003 Das et al. ..................... 455/522
2004/0002330 A1*  1/2004 Chitrapu .................... 455/426.2

(Continued)

FOREIGN PATENT DOCUMENTS

EP    1418717 A1    5/2004

(Continued)

OTHER PUBLICATIONS

3GPP TR 25.858 V5.0.0 (Mar. 2002), XP-002265002, "3rd Generation Parnership Project; Technical Specification Group Radio Access Network; High Speed Downlink Packet Access: Physical Layer Aspects (Release 5)", 31 pages.

(Continued)

*Primary Examiner*—Kent Chang
*Assistant Examiner*—Dinh P Nguyen
(74) *Attorney, Agent, or Firm*—Locke Lord Bissell & Liddell LLP

(57) ABSTRACT

The invention describes user equipment for communicating data in a communications system comprising a set of user equipment; comprising a transceiver arranged to receive a first data packet over a communications data channel and an associated second data packet over a communications control channel. The second data packet comprises a first identifier arranged to identify a subset of the set of user equipment and the first data packet comprises a second identifier arranged to identify at least one of the subset of user equipment. The user equipment further comprising a processor arranged to determine from the second data packet first identifier if the said user equipment is one of the said subset of user equipment and from the second identifier if the said user equipment is said the at least one of the subset of user equipment. Wherein the processor is further arranged to decode the first data packet if the processor determines the said user equipment is one of the said subset of user equipment and is the said at least one of the subset of user equipment.

26 Claims, 3 Drawing Sheets

U.S. PATENT DOCUMENTS

2005/0237960 A1* 10/2005 Kim .......................... 370/312
2006/0183471 A1* 8/2006 Samuel et al. .............. 455/423

FOREIGN PATENT DOCUMENTS

| EP | 1657844 A1 | 5/2006 |
| WO | WO2005006829 A2 | 1/2005 |
| WO | WO2006000876 | 1/2006 |

OTHER PUBLICATIONS

ETSI TS 125 321 V6.7.0 (Dec. 2005), "Universal Mobile Telecommunications System (UMTS); Medium Access Control (MAC) protocol specification (3GPP TS 25.321 version 6.7.0 Release 6)", 93 pages.

International Search Report of PCT/IB2007/000363, Date of Completion of Search: Nov. 23, 2007.

British Search Report corresponding to GB0602762.7 dated Jun. 7, 2007.

* cited by examiner

USER EQUIPMENT

BACKGROUND TO THE INVENTION

1. Field of the Invention

This invention relates to user equipment for communication systems and in particular, but not exclusively for high speed downlink packet access (HSDPA) for WCDMA communication systems.

2. Description of the Related Art

As is known in the field a further development of the wideband code division multiple access (WCDMA)/universal mobile telecommunications system (UMTS) communication system defined by the 3GPP organization, is the definition of the system known as high speed downlink packet access (HSDPA). HSDPA operates as a time shared communications channel which provides the potential for high peak data rates as well as the possibility for having a high spectral efficiency.

Current 3GPP HSDPA standards (e.g. 3GPP TS 25.858) define a HS-DSCH channel (high speed downlink shared channel), which is a downlink transport channel shared by several user equipment units. The HS-DSCH is associated with one downlink DPCH (downlink dedicated physical channel) or F-DPCH (option in 3GPP Rel6) per active user, and one or several shared control channels (HS-SCCH). The HS-DSCH can be transmitted over the entire cell or over only part of the cell using for example beam-forming antennas.

HSDPA improves system capacity and increases user data rates in the downlink, in other words for transmission of data from a radio base station (RBS) which in a UMTS system is also known as a node B server (and in the GSM by the term base transceiver station BTS) to the user equipment.

This improved performance is based on three aspects. The first aspect is the use of adaptive modulation and coding.

In HSDPA, the link adaptation entity in the radio base station (Node-B server) tries to adapt to the current channel conditions of a certain user equipment (or user terminal) by selecting the highest possible modulation and coding scheme keeping the frame error probability below a certain threshold. For that purpose, the user equipment periodically sends channel quality feedback reports to the respective serving RBS, which indicate the recommended transmission format for the next transmission time interval (TTI), including the recommended transport block size, the recommended number of codes and the supported modulation scheme as well as a possible power offset. The reported channel quality indicator (CQI) value is determined on the basis of measurements of a common pilot channel. In a typical implementation it is a pointer to an index in one of the tables specified in the document "3GPP TS 25.214—Physical Layer Procedures (FDD)" that define the possible transmission format combinations (as mentioned above) for different categories of user equipment (UE).

The second aspect is the provision of fast retransmissions with soft combining and incremental redundancy, so that should link errors occur the user equipment rapidly requests retransmission of the data packets. Whereas the standard WCDMA network specifies that the requests are processed by the radio network controller (RNC), in HSDPA the request is processed by the RBS. Furthermore the use of incremental redundancy, allows the selection of correctly transmitted bits from the original transmission and retransmission in order to minimize the need for further repeat requests when multiple errors occur in transmitted signals.

The third aspect of HSDPA is fast scheduling in the RBS. This is where data to be transmitted to the user equipment is buffered within the RBS prior to transmission and the RBS using a selection criteria selects some of the packets to be transmitted based on information about the channel quality, user equipment capability, the quality of service class and power/code availability. A commonly used scheduler is the so-called proportional fair (P-FR) scheduler.

Although HSDPA is an efficient method for delivering relatively large amounts of data in relatively small time periods (the TTI for a HSDPA system is 2 ms).

This performance however can only be used when the user equipment is operating within the dedicated channel state (CELL_DCH state), in other words after a physical layer connection between UE and the RBS has been established and the layer connection has dedicated channels allocated to it.

The transition of the UE to the dedicated channel state (CELL_DCH state) and establishing a HSDPA connection may take up to a second, Thus specifically where the amount of data required to be transmitted is relatively small the state transition to the CELL_DCH state can take longer that the actual data transmission.

Moreover, when the UE is in the process of changing state to the CELL_DCH state, the required state change has to be addressed to the UE by the forward access channel (FACH) which is significantly slower and less robust than the later HSDPA transmission channels.

Before and during the transition to the CELL_DCH state, the CELL_FACH state requires that both the downlink dedicated control channel (DCCH) and the downlink dedicated traffic channel (DTCH) are mapped onto the forward access channel (FACH). This requirement increases the radio resource control (RRC) signalling (caused by the extra DCCH information) and data (caused by the extra DTCH information) transmission delay. The minimum time duration of the FACH transmission (which is carried over the secondary common control physical channel (S-CCPCH)) is approximately 10 milliseconds.

During the radio resource control (RRC) connection establishment phase the common control channel (CCCH) transmission is mapped onto the forward access channel (FACH). FIG. 1 shows the procedure for transition of the UE to the dedicated channel state (CELL_DCH) as described in 3GPP technical report TR 25.931. In step 107 of FIG. 1, the RRC connection setup message which is typically carried over the common control channel (CCCH) is carried on the forward access channel (FACH) which in turn is mapped on the secondary common control physical channel (S-CCPCH).

It is also known to deliver data to a UE not in the dedicated channel (CELL_DCH) state by using the forward access channel (FACH) to deliver small amounts of data or control information to the UE. However this approach suffers from the inherent problems associated with the FACH, a low data rate and slow retransmission.

The capacity on the forward access channel (FACH) carried on the S-CCPCH is relatively low, typically between 32 to 64 kbps, which limits the use of the forward access channel to small packets.

Typically it is therefore only possible to transmit one or two common control channel (CCCH) radio link control protocol data units (RLC PDU) in a single TTI (a typical CCCH RLC PDU packet is 152 bits). Signalling radio bearers (SRB) mapped onto the dedicated control channel (DCCH) and utilising unacknowledged mode radio link control (UM RLC) packets produce RLC PDUs which are either 136 or 120 bits long. SRBs using acknowledged mode radio link control (AM RLC) produce RLC PDUs which are 128 bits long. In both the unacknowledged and acknowledged modes using the common control channel (CCCH) one or two protocol data units can be transmitted per TTI.

A typical dedicated traffic channel (DTCH) RLC PDU size is 320 bits. As the typical TTI for FACH is 10 ms a single DTCH RLC PDU (or packet) transmitted per TTI uses up all of a 32 kbps data rate capacity of the FACH alone.

The reliability of the forward access channel (FACH) is also limited since retransmissions take a considerable amount of time as retransmissions are carried out on the RLC based on the RLC status indicators transmitted on the random access channel in the uplink. In addition a message transmitted on CCCH does not have any retransmission on the RLC layer and in the case of signalling error the RRC layer needs to initiate retransmission of the RRC message if the appropriate response message is not received within a certain time. This time is typically very long (in the order of seconds), due to transmission delays in the FACH (DL) and RACH (UL) channels.

The typical 3G UE power consumption in the dedicated channel state (CELL_DCH) is approximately 250 mA, in the transitional forward access channel state (FACH) is approximately 120 mA, and in the paging channel state (CELL/URA_PCH) or in the idle state is typically <5 mA. The use of the FACH channel to transmit data can result in a higher power consumption as the forward access channel (FACH) reception requires more time to receive all of the (slow speed) data.

Therefore, in summary, the requirement to use the forward access channel (FACH) over the secondary common control physical channel (S-CCPCH) for transmission (either as an transitional state or as the operating state for passing data) are those of low data rates, slow retransmission rates, and also a relatively high UE power consumption.

SUMMARY OF THE INVENTION

It is an aim of the invention, and embodiments thereof, to provide an improvement to mobile access systems which at least partially addresses the problem disclosed above.

There is provided according to the invention a user equipment for communicating data in a communications system comprising a set of user equipment; at least one user equipment comprising: a transceiver arranged to receive a first data packet over a communications data channel and an associated second data packet over a communications control channel, wherein the second data packet comprises a first identifier arranged to identify a subset of the set of user equipment and the first data packet comprises a second identifier arranged to identify at least one of the subset of user equipment; and a processor arranged to determine from the second data packet first identifier if the said user equipment is one of the said subset of user equipment and from the second identifier if the said user equipment is said the at least one of the subset of user equipment; wherein the processor is further arranged to decode the first data packet if the processor determines the said user equipment is one of the said subset of user equipment and is the said at least one of the subset of user equipment.

The transceiver may further be arranged to receive in a further data packet a first identifier value arranged to identify the subset of user equipment as not being in a dedicated channel state.

The transceiver may further be arranged to receive in the further data packet a second identifier value to identify each of the user equipment within the same subset.

The transceiver is preferably arranged to transmit from the user equipment a feedback message.

The communications data channel is preferably a high-speed downlink shared channel (HS-DSCH).

The communications data channel may comprise at least one of: a dedicated traffic channel (DTCH); a dedicated control channel (DCCH) and a common control channel (CCCH).

The communications control channel is preferably a high speed shared control channel (HS-SCCH).

The first data packet preferably comprises radio resource communication data.

The second identifier is preferably located in a medium access control (MAC) header of the first data packet.

The first identifier is preferably located in the CRC of the second data packet.

The second identifier is preferably in a RRC level message on top of the MAC layer.

The first identifier value is preferably equal to the second identifier value.

The second data packet preferably comprises the first identifier, and the first identifier is preferably located in the CRC of the second data packet header.

The user equipment as described above may be incorporated within a communications system further comprising a communications node, the communications node may be arranged to transmit the first and second data packets over the communication data and control channels respectively to the set of user equipment, wherein the communications node is preferably further arranged to receive the feedback message.

The communications node is preferably further arranged to modify at least one transmission parameter for subsequent transmission of the first or second data packets.

The communications system may further be arranged to retransmit the first and second packets in dependence of the feedback message.

The communications node may be a radio base station.

According to a second aspect of the present invention there is provided a method for communicating a first data packet over a communications data channel to at least one user equipment; comprising the steps of: transmitting a second data packet over a communications control channel, the second data packet comprising a first identifier arranged to identify a subset of a set of user equipment; transmitting the first data packet over the communications data channel, the first data packet comprising a second identifier arranged to identify at least one of the subset of user equipment; receiving the first and second data packets at the at least one of the plurality of user equipment; determining from the second data packet first identifier if the said user equipment is one of the said subset of user equipment and from the second identifier if the said user equipment is the said at least one of the subset of user equipment; and decoding the first data packet if the said user equipment is one of the said subset of user equipment and the said user equipment is the said at least one of the subset of user equipment.

The method preferably further comprises the step of supplying each of the user equipment with a first identifier value arranged to identify the subset of user equipment as not being in a dedicated channel state.

The method may further comprise the step of supplying each of the user equipment with a first identifier value a second identifier value to identify each of the user equipment within the subset.

The method may further comprise the step of transmitting from the user equipment a feedback message.

The method may further comprise the step of receiving at a communications node the feedback message at a communications node.

The method may further comprise the step of modifying at least one transmission parameter of the communications node for subsequent transmission of the first or second data packets.

The method may further comprise the step of retransmitting the first and second packets from the communications node in dependence of the feedback message.

The communications data channel is preferably a high-speed downlink shared channel (HS-DSCH).

The communications data channel preferably comprises at least one of: a dedicated traffic channel (DTCH); a dedicated control channel (DCCH); and a common control channel (CCCH).

The communications control channel is preferably a high speed shared control channel (HS-SCCH).

The first data packet may comprise radio resource communication data.

According to a third aspect of the present invention there is provided a computer program when loaded into a computer arranged to carry out the method of communicating a first data packet over a communications data channel to at least one user equipment; comprising the steps of: receiving a first and second data packets at the at least one of the set of user equipment; the second data packet having been transmitted over a communications control channel, the second data packet comprising a first identifier arranged to identify a subset of a set of user equipment and the first data packet comprising a second identifier arranged to identify at least one of the said subset of user equipment; determining from the second data packet first identifier if the said user equipment is one of the said subset of user equipment and from the second identifier if the said user equipment is the said at least one of the subset of user equipment; and decoding the first data packet if the said user equipment is one of the said subset of user equipment and the said user equipment is the said at least one of the subset of user equipment.

According to a fourth aspect of the present invention there is provided a user equipment comprising a transceiver arranged to receive and decode data from a channel within a shared communications channel with a capacity greater than 64 kbps, wherein the channel is a free channel.

The free channel is preferably an unreserved or undedicated channel.

The user equipment is preferably arranged to receive and decode the data when the user equipment operates in at least one of: a idle state; a forward access state and a paging state.

The channel is preferably a high speed downlink shared communications channel within a high speed downlink packet access system.

According to a fifth aspect of the present invention there is provided a user equipment comprising a transceiver arranged to receive and decode radio resource connection data from a single unreserved channel within a shared communications channel.

According to a sixth aspect of the present invention there is provided a communications node comprising a transceiver arranged to transmit radio resource connection data into a single unreserved channel within a shared communications channel.

According to a seventh aspect of the present invention there is provided a user equipment for communicating data in a communications system comprising a set of user equipment; comprising: a transceiver arranged to receive a first data packet over a communications data channel and an associated second data packet over a communications control channel, wherein the second data packet comprises a first identifier arranged to identify a subset of the set of user equipment and either of the first data packet or the second data packet comprise a second identifier arranged to identify at least one of the subset of user equipment; and a processor arranged to determine from the second data packet first identifier if the said user equipment is one of the said subset of user equipment and from the second identifier if the said user equipment is said the at least one of the subset of user equipment, wherein the processor is further arranged to decode the first data packet if the processor determines the said user equipment is one of the said subset of user equipment and is the said at least one of the subset of user equipment.

BRIEF DESCRIPTION OF THE FIGURES

The invention is described by way of example only with reference to the accompanying figures in which.

DESCRIPTION OF THE PREFERRED EMBODIMENTS

The invention is described herein by way of example with reference to a number of embodiments. The invention is described in the context of a cellular communications system and specifically to a HSDPA WCDMA/UMTS communications system. It is however understood that the invention may equally be capable of being implemented in any communications system which implements scheduling of data packets especially those which need to address the problem of latency and spectral efficiency in transmission of data packets.

Figure 2:
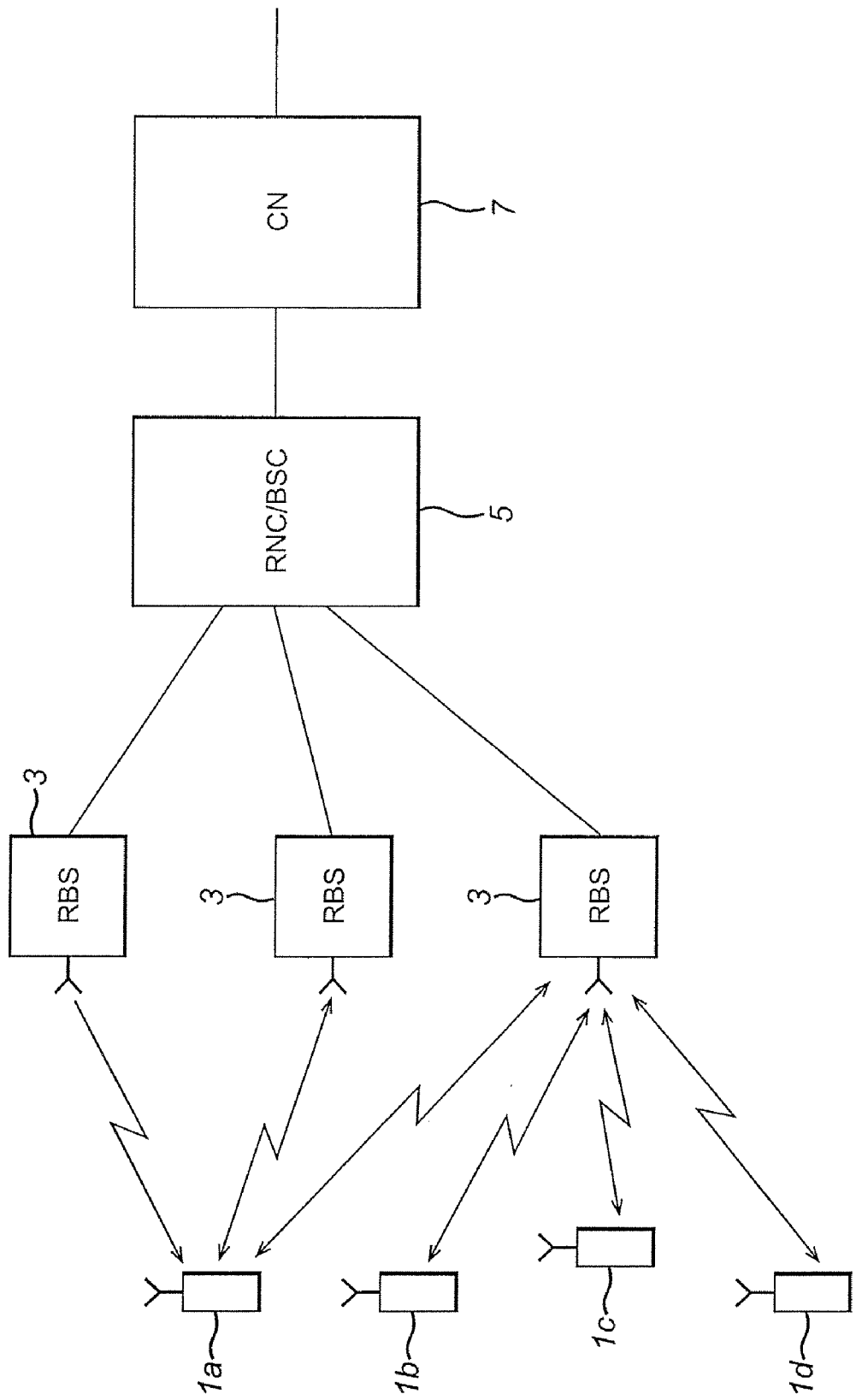
FIG. 2 shows a schematic view of a communications system within which embodiments of the present invention can be implemented.

FIG. 2 shows a schematic view of a communications system within which the embodiments of the present invention can be implemented. The system comprises at least one user equipment (UE) 1. User equipment 1 can be for example a mobile telephone, but could also be for example a communication capable laptop, personal digital assistant, or any other suitable device.

User equipment 1 communicates wirelessly by radio with a series of radio base stations (RBS) 3. The radio base stations are also known in the UMTS standard as Node-B. In the following description the terms Node-B and radio base station (RBS) are to be used interchangeably.

Each user equipment 1 is arranged to be able to communicate to more than one RBS 3 and similarly each RBS 3 is arranged to be capable of communicating to more than one UE 1. The RBS 3 further communicates with a radio network controller (RNC) 5 (which is also known in the GSM standard as a Base station controller (BSC)). The RNC 5 can further communicate to a core network (CN) 7. The CN 7 can further communicate with other networks, for example further public land mobile networks (PLMNs) or to the network of computers known as the 'Internet'.

To clarify some of the terms used in the embodiments of the invention described below we describe with the assistance of FIG. 1 a flowchart for a radio resource controller (RRC) connection establishment as would be carried out by a UE 1 in the network as defined by 3GPP TR 25.931.

In step 101, the UE 1 initiates set up of a radio resource controller connection by sending a radio resource controller (RRC) connection request message on the common control channel (CCCH) to the serving RNC 5 via the selected cell that is the cell of the RBS 3. The connection request contains the parameters of the initial user equipment (UE) 1 identity value, and the cause for establishment of the connection.

In the step 102, the serving radio network controller (RNC) 5 establishes the Radio Resource Control (RRC) connection to the UE 1 and decides to use a dedicated channel for this particular RRC connection, and allocates a UTRAN (UMTS terrestrial radio access network) RNTI (radio network temporary identifier) and radio resources L1, L2 for the radio resource controller connection. When a dedicated channel is to be set up, a node B application protocol (NBAP) message, a "radio link set up request" message, is sent to the RBS 3. The parameters contain within the radio link set up request include the cell identification value, the transport format set, the transport format combination set, the frequency, the uplink scrambling codes to be used (for frequency division duplex (FDD) communication only), the time slots to be used (for time division duplex (TDD) communication only), the user code (for TDD only) and power control information.

In step 103, the RBS 3 allocates the resources, starts reception of the uplink physical channels, and responds with a NBAP message, a "radio link setup response" message. The radio link set up response message contains parameters defining signalling link termination, transport layer addressing information (such as the ATM adaptation layout type 2 (AAL2) address, AAL2 binding identity) for the Iub data transport bearer.

In step 104, the serving radio network controller initiates the set up of Iub data transport bearer using the access link control application part protocol (ALCAP). This request contains the AAL2 binding identity to bind the Iub data transport bearer to the dedicated channel. The request for setup of Iub data transport bearer is acknowledged by the RBS 3.

In steps 105 and 106, the RBS 3 and the serving RNC 5 establish synchronism for the Iub and Iur data transport bearers by means of exchange of the appropriate dedicated channel frame protocol frames, e.g. the "downlink synchronisation" and "uplink synchronisation" messages. Following synchronisation, the RBS 3 starts the downlink transmission to the UE 1.

In step 107, a message is sent from the serving RNC 5 to the UE 1, the message being a radio resource controller (RRC) connection set up message sent on the common control channel (CCCH). The RRC connection set up messages contains the parameters of the initial UE identity value, the U-RNTI, (valid inside UTRAN in CELL_FACH state and in CELL/URA_PCH), the C-RNTI (valid inside cell in CELL_FACH state), the capability update requirement, the transport format set, the transport format combination set, the frequency, the downlink frequency scrambling code (FDD only), the time slots (TDD only), the user code (TDD only), power control information and other data as defined in 3GPP standard TS25.331 section 10.2.40 in particular in order to configure the signalling connection on HSDPA.

In step 108, the RBS 3 achieves uplink synchronisation and notifies the serving RNC 5 with a NBAP message, a "radio link restore indication".

In step 109, a RRC connection set up complete message is sent on the dedicated control channel (DCH) from the UE 1 to the serving RNC 5 via the serving RBS 3. This RRC connection set up complete message contains the parameters of integrity information, ciphering information, and UE radio access capability.

As has been described above, these steps are required in order to carry out a high speed downlink packet access communication.

Thus in HSDPA operation in CELL_DCH state each UE is assigned a unique H-RNTI that is used to identify the intended receiver of each transmitted packet already in the physical layer.

In the embodiments of the invention as described in detail below the HSDPA usage in other than CELL_DCH state uses a common physical layer identifier (i.e. a group UE ID value) which is known to a UE 1 without the need to uniquely assign a ID to each UE. The intended UE receiver is then identified then by the MAC header in case of DTCH or DCCH transmission or from UE ID included in RRC message in case of CCCH message (RRC connection setup, Cell update confirm) just as is done by the FACH in the prior art.

In embodiments of the present invention a UE in either the dedicated or non dedicated channel state can detect whether the transmission was for it or not, but in CELL_DCH the UE knows this from the physical layer without needing to receive and decode the data packet first.

Figure 3:
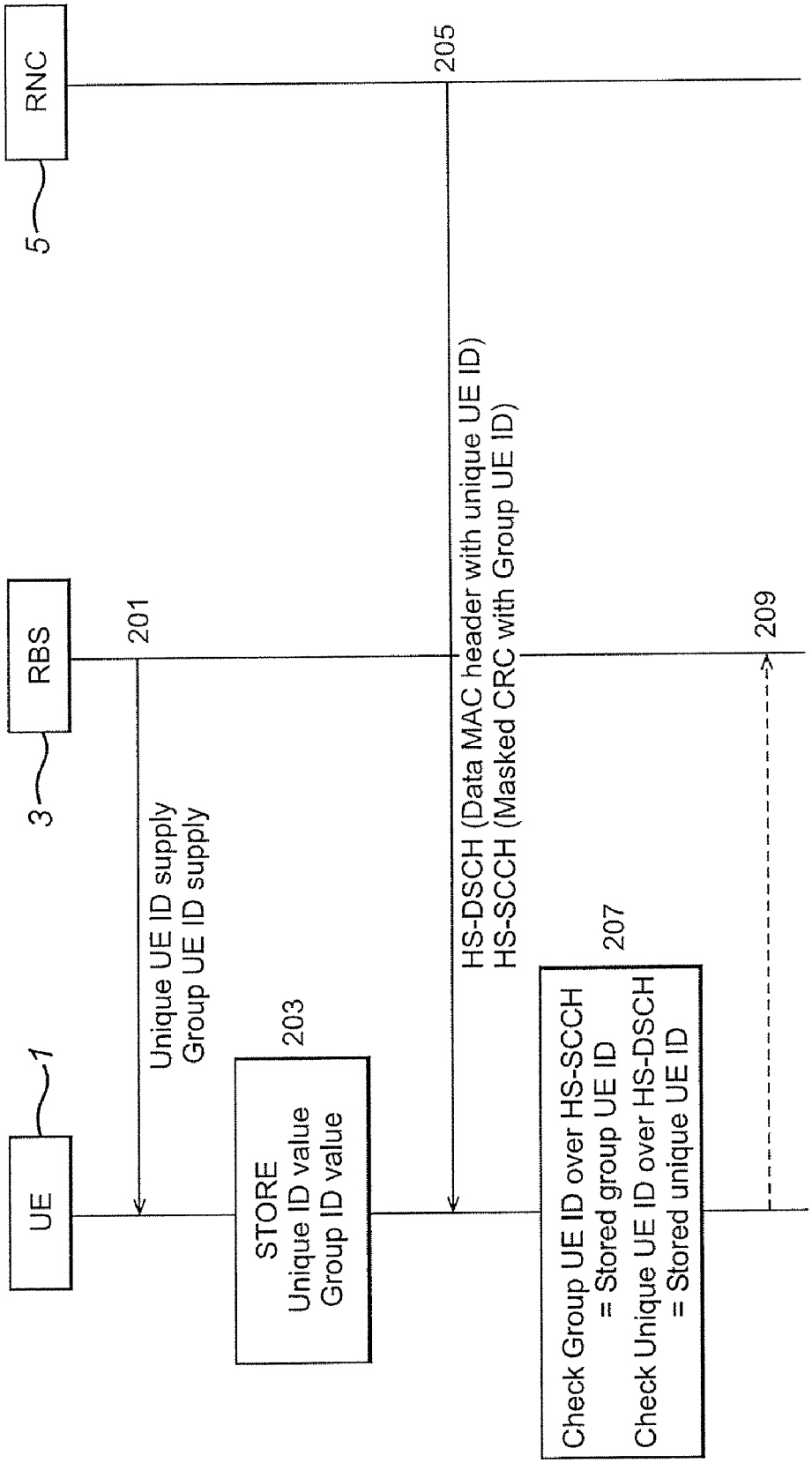
FIG. 3 shows a flow diagram showing the steps performed in a first embodiment of the present invention.

In FIG. 3 a flow chart showing the steps carried out in a first embodiment of the invention are described.

In step 201 a UE 1 receives a group identification value (a group UE ID value) from a system information broadcast that is typically used for HS-SCCH detection before the RRC connection has been established or when C-RNTI is not valid after cell reselection, i.e. to receive the RRC connection setup message or the cell update confirm (when only U-RNTI is valid).

The UE 1 also receives an individual identification value (an individual UE ID value) identifying a single UE 1. This ID value can be assigned, during a RRC connection (C-RNTI), at step 107, so that UE having RRC connection and valid C-RNTI can detect if the transmission is intended to it directly from HS-SCCH at physical layer. In some embodiments of the invention these ID values can be updated by dedicated RRC signalling.

In step 203 the received identification values are stored in the UE 1.

In step 205 the UE receives a high speed downlink packet access (HSDPA) data frame sent using the high speed downlink shared channel (HS-DSCH) with a MAC header value indicating a unique UE ID value. The associated high speed shared control channel (HS-SCCH) data for the same frame comprises information identifying a group UE ID value. The HS-SCCH data also specifies the transport format and the rate of the associated high speed physical downlink shared channel—the physical channel the HS-DSCH data is transmitted over. As the U-RNTI or C-RNTI values are used in the MAC header the UE can detect if the data transmission was for it or not, even if the group ID is used, for example in case of a CCCH transmission the UE 1 can identify if the transmission was for the UE in the RRC layer.

In step 207 the UE 1 checks to see if for the ID sent over the high speed shared control channel (HS-SCCH) matches the group ID of the UE or, if one was assigned, the dedicated ID of the UE. The group UE ID or dedicated ID value is transmitted in a known manner, i.e. the value within the HS-SCCH is transmitted in the same way as would be carried out for any UE in the dedicated channel state which has a specific UE ID assigned to it during the RRC setup as described above.

The specific UE to which the data is addressed, rather than the group of UEs identified by the group UE ID value is determined by a unique identifier in the medium access control (MAC) protocol header associated with the HS-DSCH.

Thus in embodiments of the invention small amounts of high speed data can be received by a UE not in the dedicated channel without the requirement of passing through the forward access channel state.

In some embodiments of the invention the group ID value is known in advance, based on predefined rules, to all UE not in the dedicated channel state (CELL_DCH)—i.e. all UE 1 not currently carrying out data communication with the network.

In some embodiments of the invention the group ID value is transmitted to all UE not in the dedicated channel state (CELL_DCH)—i.e. all UE 1 not currently carrying out data communication with the network.

In further embodiments of the invention any UE 1 establishing the RRC connection as described earlier can use the UE ID value transmitted to it in the system information broadcast (SIB). The SIB is information broadcast across the cell and can be received by any UE within the cell without the RBS 3 knowing which UE 1 have received the SIB. The SIB transmissions do not require an acknowledgement transmission and therefore can be advantageous carriers of the group UE ID value. In further embodiments the RNC 5 allocates the group UE ID values which are passed to the RBS 3 to be transmitted to the UE 1.

In some embodiments the group UE ID value is known by RBS 3 as a result of a network configuration or reconfiguration process.

In some embodiments of the invention the unique ID is transmitted to the UE 1 by being masked directly to a CRC in the HS-SCCH. Masking a unique ID to a CRC on HS-SCCH means that the CRC, a kind of a checksum to enable the receiver to determine if a packet is correctly received, is modified by the ID value in such a way that only a receiver knowing the ID can determine the correct CRC value and therefore is able to detect whether the HS-SCCH was received correctly. The advantage with masking an ID to a CRC on the HS-SCCH is that no additional bits are inserted onto the HS-SCCH due to the inclusion of the UE unique ID, but the unique UE ID information is present in the HS-SCCH message. In other embodiments the ID value is inserted on the MAC header/RRC layer where there is a specific bit field for the UE ID value reserved. The embodiments using the MAC header are not required to carry out a masking or modification of the signal other than the insertion of the value in the bit field.

As the UE 1 must first detect the ID (i.e. determine if the UE-specific CRC indicates a correct reception) on the HS-SCCH before it tries to decode the HS-DSCH to see if the unique ID in either the MAC header or the RRC message matches the UE unique ID value. Therefore the MAC/RRC level ID must be the unique UE ID if the HS-SCCH ID is the group UE ID and if the HS-SCCH ID is the unique UE ID then the MAC/RRC UE ID can be considered to be equal in value.

In some embodiments of the invention UE 1 in the UTRAN registration area paging channel state (CELL/URA_PCH) or in the idle state would not listen to the high speed downlink packet access information continuously, but is arranged to receive both HS-DSCH and HS-SCCH packets only at predetermined times.

In a further embodiment the UE 1 is arranged to listen for the HS-SCCH at predetermined times and then only if it receives a data packet with the predetermined group UE ID listen for the data on the HS-DSCH. This embodiment is similar to the conventional HSDPA reception mode whereby the UE detects a HS-SCCH packet addressed to it before arranging itself to receive an associated UE addressed HS-DSCH packet with the difference that the UE is only listening to the HS-SCCH at predetermined times and not therefore allowing the UE to switch off the radio receiver during the non-reception periods thus saving battery power.

In other embodiments of the invention, the UE listens when triggered by an event. For example the random access channel (RACH) can be used due to UE activity or in response to a paging message. In such embodiments the UE is able to conserve power, in other words to "sleep" and save battery power if no activity is expected.

In such an embodiment an UE 1 in idle mode would start high speed data packet access reception after sending the radio resource controller connection request on the random access channel (RACH). An UE 1 in CELL/URA_PCH state would start HSDPA reception after sending the cell update message. The sleep mode is simpler to organise with the use of the HS-DSCH since the TTI is short (2 milliseconds compared to the forward access channel with a 10 millisecond TTI).

The user equipment 1 in the transitional CELL_FACH state can be arranged in some embodiments to receive HSDPA data continuously if the network is able to transmit data or signalling to the user equipment on either the dedicated traffic channel (DTCH) or the dedicated control channel (DCCH). UE 1 in the CELL_FACH state can also be arranged to receive the data occasionally where discontinuous reception periods (DRX) are indicated for the HSDPA data transmission.

In the above embodiments of the invention, compared against conventional HSDPA from UE in CELL_DCH states, does not have the provision to send from the UE 1 to the RBS 3 a specific channel quality indicator (CQI) report (this is typically transmitted on the high speed dedicated control channel—the uplink feedback channel of the HSDPA, for the user equipment in the dedicated channel mode in order to assist the selection of MCS (modulation and coding scheme) selection for the high speed physical downlink shared channel (HS-PDSCH) and the power setting of the high speed shared control channel (HS-SCCH). The selection of the MCS values is arranged so that for a good quality channel the MCS values can be chosen to use higher order modulation and less coding and thus increase the data throughput and in bad quality channels the MCS values can be chosen to use a simple modulation and more error correction coding to reduce errors at the cost of smaller data transmission capacity.

Furthermore the above embodiments have no acknowledgment feedback (ACK/NACK) for the high speed acknowledgement request (HARQ—the high speed downlink shared channel reception acknowledgement). Thus for the above embodiments there is no signal to indicate whether a retransmission is requested as the ACK/NACK signals are typically transmitted on the uplink on a high speed dedicated control channel (the uplink feedback channel of the HSDPA) for the user equipment in the dedicated channel state.

In a further embodiment of the invention, the RBS 3 selects the high speed-shared control channel power and the MCS values for the HS-DSCH accordingly in order that it is able to be received at the cell edge. In further embodiments of the invention mechanisms are provided for estimating the required HS-SCCH power requirements and suitable MCS values for the HS-DSCH are required and these values selected for the HS-SCCH and HS-DSCH data streams.

In some embodiments of the present invention an uplink feedback channel, such as an L1 channel, can be set up and used to transfer CQI and acknowledgement channel data.

In other embodiments of the invention the RNC can determine the modulation and coding scheme (MCS) to be used based on measurement of the channel. In other embodiments of the invention the RNC 5 may send information to the Node-B on selecting a suitable MCS.

In other embodiments the same transmission values are transmitted more than once in order to produce the required time diversity in the system and also to produce a required HARQ gain.

In the above embodiments the transmission system is provided with a degree of system control—all of the UE 1 in the cell are able to receive the data.

In a further embodiment of the invention, the RBS 3, although not having a user equipment specific CQI report, receives from the UE 1 a predefined uplink scrambling code containing transmission feedback after receiving the high downlink shared channel transmission intended for it. The transmission feedback signal in these embodiments enables a HARQ method as known in the art to be used. This is shown in FIG. 3 in step 209.

In further embodiments of the invention, a CQI report is transmitted from the UE with transmission feedback in order to be able to calculate subsequent high speed shared control channel (HS-SCCH) power settings and high speed downlink shared channel (HS-DSCH) MCS selection.

Embodiments of this invention as described above can be implemented by requiring any UE with the group UE ID to acknowledge the receipt of the packet and to transmit CQI report as if the data was intended for it. An alternative embodiment requires that any UE identifying the UE's individual UE ID in the medium access controller protocol data unit and/or the radio resource controller message after first detecting the group UE ID in the HS-SCCH before transmitting any acknowledgment to the network.

In some embodiments of the invention the controlling radio network controller (RNC) could use single ATM adaptation layout type 2 (AAL2) connection over the Iub interface for common control channel (CCCH) and for all downlink control channel (DCCH) and dedicated traffic channel (DTCH) allocated for the UE in the forward access channel transitional state. Thus MAC-c multiplexing can in some embodiments be used instead of forward access channel transmission state.

In further embodiments of the invention, where it is required to meet different priority and quality of service (QoS) requirements separate AAL2 connections are allocated for the CCCH, DCCH and DTCH. For example transmission of the common control channel (CCCH) and dedicated control channel (DCCH) could have in some embodiments a higher priority and reliability factor than the dedicated traffic channel (DTCH).

Figure 1:
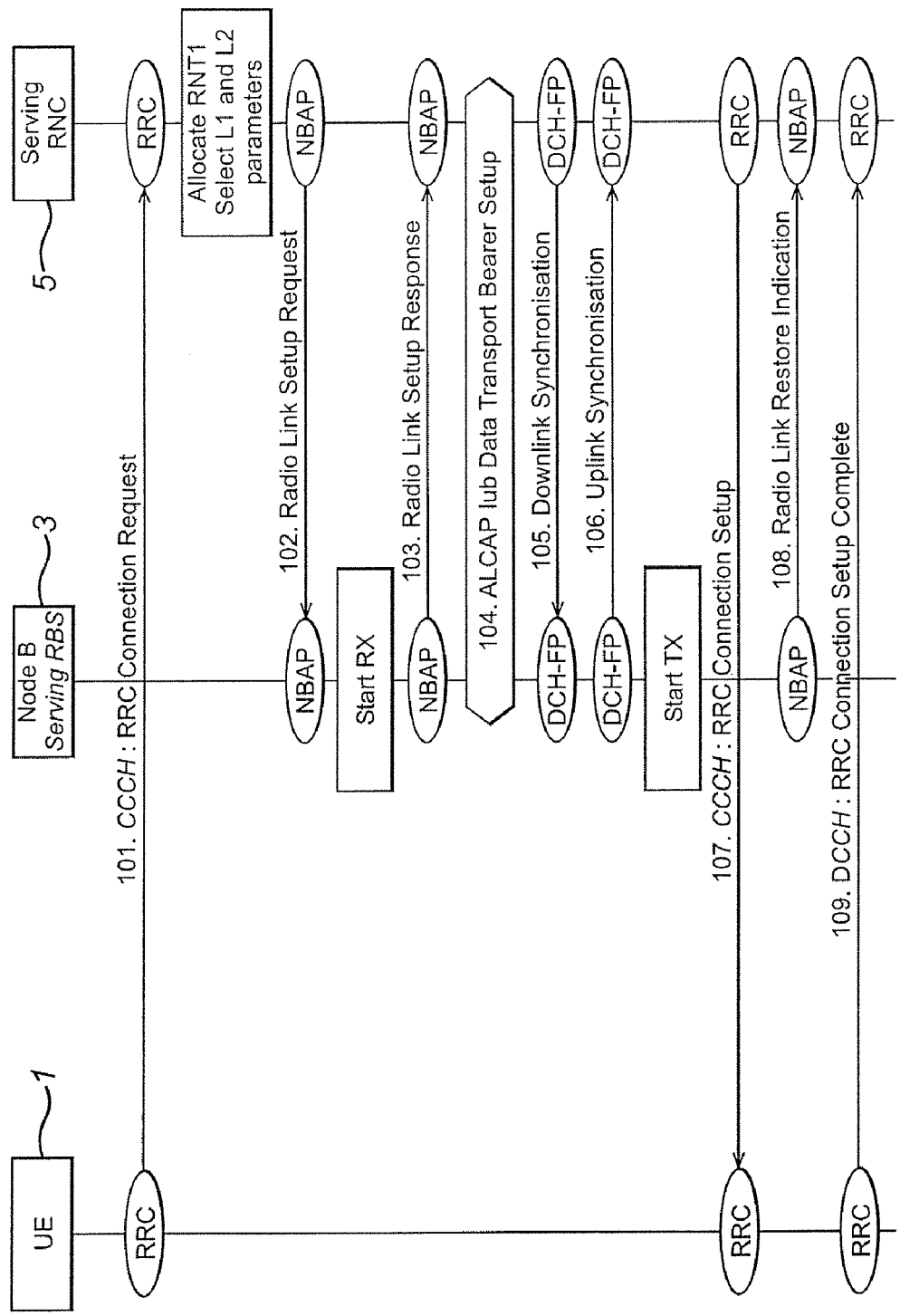
FIG. 1 shows a flow diagram showing the steps performed as a UE establishes a RRC connection and moves to a dedicated channel (CELL_DCH) state.

Although the embodiments described above refer to the use of the HSDPA channels to transmit moderate amounts of data to the UE this transmission of data also applies to the transmission of data in the RRC connection step 107 from the RNC 5 to the UE 1 via the RBS 3 as shown in FIG. 1. As described above by using a channel faster than the FACH the speed of receiving the CCCH data packets can be increased and therefore the time required to setup the UE in CELL_DCH mode decreased. A specific UE ID for the CELL_DCH state is assigned to the UE at this stage.

The embodiments as described above provide a more robust and faster way to deliver user data and RRC signalling messages to a UE than using a conventional delivery method (FACH) as used in the prior art. Also by using these embodiments, UE 1 not in the dedicated channel mode of operation have a faster state transition to the dedicated channel mode of operation from the idle or paging modes as they only require to receive a moderate amount of data which can be served with HSDPA techniques without requiring the user equipment to exchange data via the FACH state.

Although the above embodiments only have partial HSDPA support (for example in some embodiments there is no uplink feedback from the user equipment and therefore no knowledge of CQI or no possibility to receive ACK/NACK messages in the RBS 3), the gain in terms of decreased delays would be inevitable due to the much shorter TTI of the HSDPA over the FACH. Furthermore, as described in some embodiments there is a possibility of using blind retransmissions to achieve a gain from HARQ combining.

Although the system requires approximately 5 times more power to deliver the same data in 2 ms than in 10 ms and thus there is no power saving in this and, there is a benefit in that it is not necessary to allocate a specific power share for HSDPA transmission for users not in the dedicated channel state (CELL_DCH) as all of the UE time-share the same power resource. In the prior art examples FACH power was needed to be statically allocated for FACH used whether the channel was actually utilised or not.

Furthermore, as the present invention uses the existing layer-1 of the HSDPA network specification the implementation of the invention is relatively simple.

As also described above the power consumption of the UE in the CELL_FACH state is an issue in always on applications for example in push mail which send periodic keep alive messages. In these situations, even if the amount of data is very low the user equipment is kept on the forward access channel until the inactivity timer expires. Typically the inactivity timer is about 2 seconds. Using discontinuous reception (DRX) as described above the power consumption could be considerably reduced. This would enable a major improvement in the UE stand by time for always on applications.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A device, comprising:
 a receiver configured to receive a first data packet over a communications data channel shared by a set of devices in a communications system and an associated second data packet over a communications control channel shared by the set of devices, wherein the second data packet comprises a first identifier configured to identify a subset of the set of devices and the first data packet comprises a second identifier configured to identify at least one device of the subset of devices; and a processor configured to determine from the second data packet first identifier if the device is one of the subset of devices and from the second identifier if the device is the at least one device of the subset of devices;
 wherein the processor is further configured to decode the first data packet if the processor determines the device is one of the subset of devices and is the at least one device of the subset of devices.

2. The device as claimed in claim 1, wherein the receiver is further configured to receive in a further data packet a first identifier value configured to identify the subset of devices as not being in a dedicated channel state.

3. The device as claimed in claim 2, wherein the receiver is further configured to receive in the further data packet a second identifier value to identify each of the devices within the same subset.

4. The device as claimed in claim 1, wherein the receiver is part of a transceiver that is configured to transmit from the device a feedback message.

5. The device as claimed in claim 1, wherein the communications data channel is a high-speed downlink shared channel (HS-DSCH).

6. The device as claimed in claim 5, wherein the communications data channel comprises at least one of:
   a dedicated traffic channel (DTCH);
   a dedicated control channel (DCCH) and
   a common control channel (CCCH).

7. The device as claimed in claim 1, wherein the communications control channel is a high speed shared control channel (HS-SCCH).

8. The device as claimed in claim 1, wherein the first data packet comprises radio resource communication data.

9. The device as claimed in claim 1, wherein the second identifier is located in a medium access control (MAC) header of the first data packet.

10. The device as claimed in claim 1, wherein the first identifier is located in the CRC of the second data packet.

11. The device as claimed in claim 1, wherein the second identifier is in a RRC level message on top of the MAC layer.

12. The device as claimed in claim 1, wherein first identifier value is equal to the second identifier value.

13. The device as claimed in claim 1, wherein the second data packet comprises the first identifier, and the first identifier is located in the CRC of the second data packet header.

14. A communications system comprising:
   a device as claimed in claim 4, and
   a communications node, the communications node being configured to transmit the first and second data packets over the communication data and control channels respectively to the set of devices,
   wherein the communications node is further configured to receive the feedback message.

15. A method comprising:
   receiving at a device a first data packet over a communications control channel shared by a set of devices, the first data packet comprising a first identifier configured to identify a subset of the set of devices;
   receiving at the device a second data packet over a communications data channel shared by the set of devices, the second data packet comprising a second identifier configured to identify at least one device of the subset of devices;
   determining from the first data packet first identifier if said device is one of said subset of devices and from the second identifier if said device is said at least one device of the subset of devices; and
   decoding the second data packet if said device is one of said subset of devices and said device is said at least one device of the subset of devices.

16. A method as claimed in claim 15, further comprising receiving at each of the devices a first identifier value configured to identify the subset of devices as not being in a dedicated channel state.

17. A method as claimed in claim 15, further comprising receiving at each of the devices a second identifier value to identify each of the devices within the subset.

18. A method as claimed in claim 15, further comprising transmitting from the device a feedback message.

19. A method as claimed in claim 18, further comprising transmitting the feedback message to a communications node.

20. A method as claimed in claim 19, further comprising causing modification of at least one transmission parameter of the communications node for subsequent transmission of the first or second data packets as a result of the transmitted feedback message.

21. A method as claimed in claim 19, further comprising re-receiving the first and second packets from the communications node in dependence of the feedback message.

22. A method as claimed in claim 15, wherein the communications data channel is a high-speed downlink shared channel (HS-DSCH).

23. A method as claimed in claim 15, wherein the communications data channel comprises at least one of:
   a dedicated traffic channel (DTCH);
   a dedicated control channel (DCCH); and
   a common control channel (CCCH).

24. A method as claimed in claim 15, wherein the communications control channel is a high speed shared control channel (HS-SCCH).

25. A method as claimed in claim 15, wherein the second data packet comprises radio resource communication data.

26. An article of manufacture comprising a non-transitory computer-readable medium containing computer-readable code, which, when executed by a computer causes a device to:
   receive first and second data packets at at least one device of a set of devices, the first data packet having been received over a communication data channel shared by the set of devices and the second data packet having been received over a communications control channel shared by the set of devices, the second data packet comprising a first identifier configured to identify a subset of said set of devices and the first data packet comprising a second identifier configured to identify at least one device of the subset of devices;
   determine from the second data packet first identifier if the device is one of the subset of devices and from the second identifier if the device is the at least one device of the subset of devices; and
   decode the first data packet if the device is one of the subset of devices and the device is the at least one device of the subset of devices.

* * * * *